United States Patent
Min et al.

(10) Patent No.: US 9,242,894 B2
(45) Date of Patent: Jan. 26, 2016

(54) WINDOW FOR DISPLAY DEVICE, METHOD OF MANUFACTURING THE SAME AND DISPLAY DEVICE INCLUDING THE SAME

(71) Applicant: Samsung Display Co., Ltd., Yongin, Gyeonggi-Do (KR)

(72) Inventors: Myung An Min, Yongin (KR); Kyong Bin Jin, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/175,055

(22) Filed: Feb. 7, 2014

(65) Prior Publication Data

US 2015/0064420 A1   Mar. 5, 2015

(30) Foreign Application Priority Data

Sep. 4, 2013   (KR) .................. 10-2013-0106152

(51) Int. Cl.
  *B32B 3/02*   (2006.01)
  *C03C 17/34*  (2006.01)
  *C03C 17/00*  (2006.01)

(52) U.S. Cl.
  CPC .............. *C03C 17/34* (2013.01); *C03C 17/002* (2013.01); *C03C 17/007* (2013.01); *Y10T 428/25* (2015.01)

(58) Field of Classification Search
  CPC .... C03C 17/002; C03C 17/007; C03C 17/34; Y10T 428/25
  See application file for complete search history.

(56) References Cited

U.S. PATENT DOCUMENTS

2014/0127442 A1* 5/2014 Ryu et al. .................. 428/38

FOREIGN PATENT DOCUMENTS

| KR | 1020090008617 A | 1/2009 |
|----|-----------------|--------|
| KR | 1020100063718 A | 6/2010 |
| KR | 1020110131719 A | 12/2011 |
| KR | 1020120126781 A | 11/2012 |

* cited by examiner

*Primary Examiner* — Elizabeth Mulvaney
(74) *Attorney, Agent, or Firm* — Cantor Colburn LLP

(57) ABSTRACT

A window for a display device includes a display device window mother substrate; and a color layer on the display device window mother substrate. The color layer includes a transparent ink layer on the display device window mother substrate and including a pigment particulate, a solid color layer on the transparent ink layer, and a shield ink layer on the solid color layer.

18 Claims, 1 Drawing Sheet

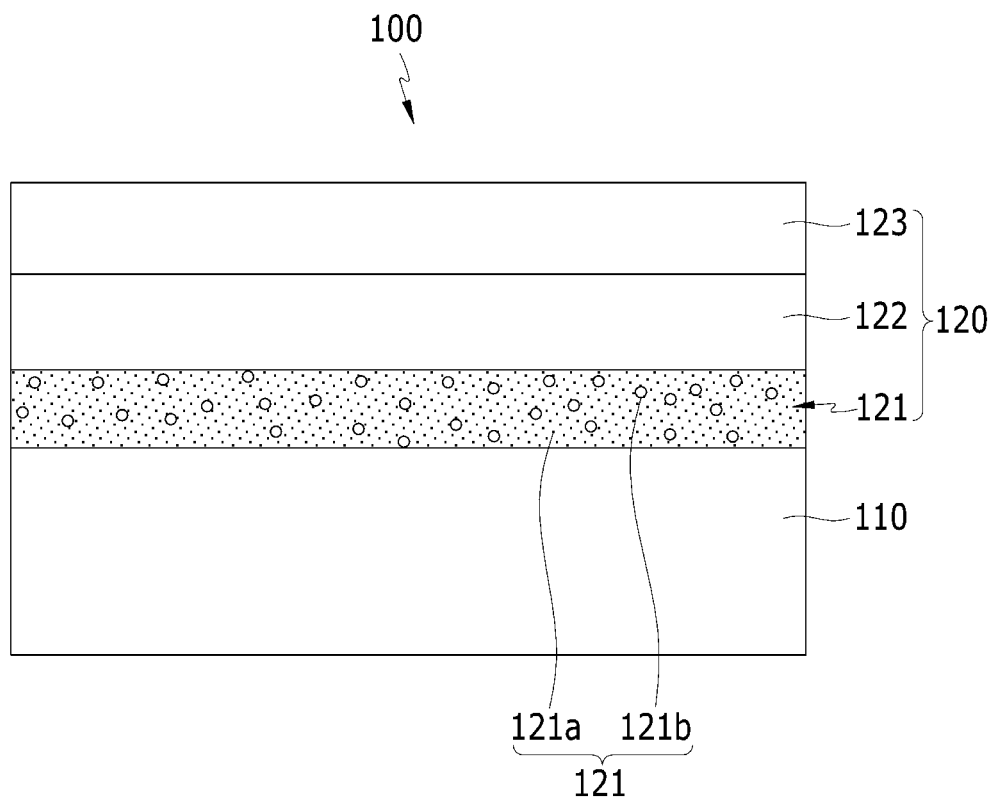

WINDOW FOR DISPLAY DEVICE, METHOD OF MANUFACTURING THE SAME AND DISPLAY DEVICE INCLUDING THE SAME

This application claims priority to Korean Patent Application No. 10-2013-0106152 filed on Sep. 4, 2013, and all the benefits accruing therefrom under 35 U.S.C. §119, the entire contents of which are incorporated herein by reference.

BACKGROUND

1. Field

A window for a display device and a display device including the same are disclosed.

2. Description of the Related Art

Display devices include a liquid crystal display ("LCD"), a plasma display panel ("PDP"), an organic light emitting diode display ("OLED"), a field effect display ("FED"), an electrophoretic display device, and the like.

Such display devices include a display module displaying an image, and a window protecting the display module.

The window for a display device may have applied thereto such as by printing, a combination of a particulate such as pearl, a metal flake or the like, with a color ink, to improve the appearance and perceived beauty of the display device.

SUMMARY

One or more exemplary embodiment provides a window for a display device capable of improving the appearance and perceived beauty of the display device and simultaneously, reducing or effectively preventing a stain on a surface of the window and/or the display device.

One or more exemplary embodiment also provides a method of manufacturing the window for a display device.

One or more exemplary embodiment also provides a display device including the window.

According to an exemplary embodiment, a window for a display device includes a display device window mother substrate; and a color layer on the display device window mother substrate. The color layer includes a transparent ink layer on the display device window mother substrate and including a pigment particulate, a solid color layer on the transparent ink layer, and a shield ink layer on the solid color layer.

The pigment particulate may include a metal flake, pearl, mica, silica, or a combination thereof.

The solid color layer may have a stacked structure of two or more layers.

The solid color layer may include a combination of two or more color inks.

The display device window mother substrate may include glass or a light-transmitting polymer resin.

The light-transmitting polymer resin may include polyethyleneterephthalate ("PET"), polycarbonate ("PC"), polymethylmethacrylate ("PMMA"), a polycarbonate/polymethylmethacrylate ("PC/PMMA") copolymer, or a combination thereof.

The pigment particulate may be included in the transparent ink layer at about 1 weight percent (wt %) to about 50 wt % based on a total weight of the transparent ink layer.

The display device window mother substrate may have a thickness of about 300 micrometers ($\mu$m) to about 1000 $\mu$m.

The transparent ink layer may have a thickness of about 4 $\mu$m to about 10 $\mu$m.

The solid color layer may have a thickness of about 4 $\mu$m to about 10 $\mu$m.

The shield ink layer may have a thickness of about 4 $\mu$m to about 10 $\mu$m.

The window for a display device may have a total thickness of less than or equal to about 1 millimeter (mm).

According to another exemplary embodiment, a method of manufacturing a window for a display device includes preparing a display device window mother substrate and forming a color layer on the window mother substrate. The forming the color layer includes combining a transparent ink and a pigment particulate to form a transparent ink layer, forming a solid color layer on the transparent ink layer, and forming a shield ink layer on the solid color layer.

The color layer may be formed by a solution coating method or a film attachment method.

The solution coating method may include spin coating, screen printing, pad printing, inkjet printing, one drop filling ("ODF"), or a combination thereof.

The pigment particulate may include a metal flake, pearl, mica, silica, or a combination thereof.

The pigment particulate may be included in the transparent ink layer at about 1 wt % to about 50 wt % based on a total weight of the transparent ink layer.

According to another exemplary embodiment, a display device includes the above-described window, on a display module.

In one or more exemplary embodiment, a window for a display device is provided which has an improved appearance and perceived beauty and also simultaneously minimizes a stain on the surface of the display device.

BRIEF DESCRIPTION OF THE DRAWING

The above and other features of the invention will become more apparent by describing in further detail exemplary embodiments thereof with reference to the accompanying drawings, in which:

FIG. 1 is a cross-sectional view showing an exemplary embodiment of a window for a display device according to the invention.

DETAILED DESCRIPTION

The invention is described more fully hereinafter with reference to the accompanying drawings, in which exemplary embodiments of the invention are shown. However, this disclosure may be embodied in many different forms and is not construed as limited to the exemplary embodiments set forth herein. Rather, these exemplary embodiments are provided so that this disclosure will be thorough and complete, and will fully convey the scope of the invention to those skilled in the art. In the drawings, the thickness of layers, films, panels, regions, etc., are exaggerated for clarity.

Like reference numerals designate like elements throughout the specification. As used herein, the term "and/or" includes any and all combinations of one or more of the associated listed items. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, connected may refer to elements being physically, electrically and/or fluidly connected to each other.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Particulates such as pearl, a metal flake or the like which are applied in combination with a color ink, to a window for a display device to improve the appearance and perceived beauty to the display device, may be influenced by a Van der Waals force in the color ink and are agglomerated. Thus, such combination applied to the window may cause an appearance defect such as a stain and the like in the display device. Therefore, there remains a need for an improved display device window and a display device including the same in which an appearance defect such as a stain and the like is reduced or effectively prevented.

Hereinafter, the invention will be described in detail with reference to the accompanying drawings.

Referring to FIG. 1, a window for a display device according to the invention will be described.

FIG. 1 is a cross-sectional view of an exemplary embodiment of a window for a display device according to the invention.

Referring to FIG. 1, the window 100 for a display device includes a window mother substrate 110 for a display device, and a color layer 120.

The window mother substrate 110 for a display device is a layer for protecting a display module of the display device, and may include glass or a light transmittance polymer resin but is not limited thereto. The window is on the viewing side of the display module.

The light transmittance polymer resin may include a resin having light transmittance without limitation, and may include, for example polyethylene terephthalate ("PET"), polycarbonate ("PC"), polymethylmethacrylate ("PMMA"), a polycarbonate/polymethylmethacrylate ("PC/PMMA") copolymer or a combination thereof.

The window mother substrate 110 for a display device may have, for example a cross-sectional thickness of about 300 micrometers (μm) to about 1000 μm, but is not limited thereto.

Next, the color layer 120 is described.

The color layer 120 is positioned on the window mother substrate 110 for a display device and provides the window 100 for a display device with a color. The color layer 120 includes a transparent ink layer 121, a solid color layer 122, and a shield ink layer 123.

Transparent ink layer 121 includes a transparent ink 121a, and a pigment particulate 121b dispersed in the transparent ink 121a.

The transparent ink 121a may include an ink having light transmittance, and may be any of a number of inks suitable for the purposes described herein.

The pigment particulate 121b is added to the transparent ink 121a and thereby the window 100 for a display device may have, for example an improved appearance and a unique perceived beauty, such as including a pearl color and/or finish viewable by a user of the display device.

The pigment particulate 121b may include, for example, a metal flake, pearl, mica, silica or a combination thereof, but is not limited thereto.

The transparent ink layer 121 may have a cross-sectional thickness of, for example, from about 4 μm to about 10 μm, but not limited thereto.

The pigment particulate 121b may have a size in consideration of a process of forming the transparent ink layer 121 and/or a desired color.

The pigment particulate 121b may be included in the transparent ink layer at about 1 weight percent (wt %) to about 50 wt % based on a total weight of the transparent ink layer 121, and the amount of the pigment particulate 121b may be controlled in accordance with beauty of the window 100 for a display device.

When pigment particulates such as a metal flake or pearl are combined with a conventional color ink, the pigment particulates sink down into a bottom area of the color ink. That is, the pigment particles are agglomerated due to a weight difference between the color ink and the pigment particulates and due to a Van der Waals force applied to the pigment particulates. In forming a window for a display device, this agglomeration of the pigment particles blocks holes of a printed surface or a plate and causes a thickness deviation during the printing (e.g., applying) of the color ink to a substrate when the pigment particulates are included in a color layer of the window. Accordingly, the thickness deviation may cause a color deviation, that is, a color stain, on the window for a display device and thus, an appearance defect of a display device is generated.

However, in an exemplary embodiment according to the invention, when the pigment particulate 121b is combined with the transparent ink 121a, the individual elements of the pigment particulate 121b and/or the transparent ink 121a is hardly distinguished from a combination of the pigment particulate with a conventional colored ink such as by the naked eye of a user. Accordingly, in one or more exemplary embodiment of a window for a display device according to the invention, the combination of the pigment particulate 121b and the transparent ink 121a may impart a uniform color as well as provide a pearl-like appearance and the like to the window 100 for a display device.

A solid color layer 122 is positioned on the transparent ink layer 121.

The solid color layer 122 imparts a desired color to the window 100 for a display device, and may include a color ink.

The solid color layer 122 may have a stacked structure of two or more layers. In one exemplary embodiment, for example, the stacked structure may include two layers, three layers or four layers, but the invention is not limited thereto. In another exemplary embodiment, the stacked structure may have a selected number of layers depending on desired colors for the window 100 for a display device.

When the solid color layer 122 has a layered structure including two or more layers, the layers may have the same or different colors from each other. In addition, one layer may include a combination of two or more inks having different colors from each other. In one exemplary embodiment, for example, one layer included in the solid color layer 122 may include a combination of a grey color ink and another color ink different from the grey color.

The solid color layer 122 may have a total cross-sectional thickness ranging about 4 μm to about 10 μm, but the invention is not limited thereto, and may have a selected cross-sectional thickness depending on a desired color for the window 100 for a display device.

A shield ink layer 123 may be positioned on the solid color layer 122, and may include, for example, a black color ink. Characteristics of the shield ink layer 123 may be selected considering a desired shielding level for the window 100 for a display device. In one exemplary embodiment, for example, the shield ink layer 123 may have a cross-sectional thickness ranging from about 4 μm to about 10 μm.

The window 100 for a display device may have, for example, a total cross-sectional thickness of less than or equal to about 1 millimeter (mm).

As aforementioned, one or more exemplary embodiment of the window 100 for a display device according to the invention includes the pigment particulate 121b and thus, may express a unique color. In addition, the pigment particulate 121b is separate from the color ink layer 122 and thus, agglomeration of the pigment particulate 121b may be reduced or effectively prevented such that a stain in the window 100 for a display device surface may be minimized or effectively prevented.

Hereinafter, a method of manufacturing the window for a display device according to the invention is described. Descriptions that are duplicated with the above-described exemplary embodiments are omitted.

An exemplary embodiment of a method of manufacturing the window for a display device includes preparing a window mother substrate for a display device and forming a color layer on the window mother substrate.

In an exemplary embodiment, forming (e.g., preparing) a color layer includes combining a transparent ink and a pigment particulate to form a transparent ink layer, forming a solid color layer on the transparent ink layer, and forming a shield ink layer on the solid color layer. The color layer may be separately prepared and then applied to the window mother substrate or the transparent ink, the solid color layer and the shield ink layer may be formed on the window mother substrate to form the color layer.

In an exemplary embodiment, the color layer may be formed on the window mother substrate by a solution coating method or a film attachment method, but is not limited thereto.

That is to say, the transparent ink layer, the solid color layer and the shield ink layer may be respectively applied to the window mother substrate using the solution coating method or the film attachment method.

Herein, the solution coating method may include a screen printing or pad printing method, and may include spin coating, inkjet printing, one drop filling ("ODF") or a combination thereof, but is not limited thereto.

A drying process may be performed between the processes of applying the transparent ink layer and the solid color layer, and between the processes of applying the solid color layer and the shield ink layer.

The transparent ink layer including a transparent ink and a pigment particulate may be the same as any one of the above-described exemplary embodiments.

In one or more exemplary embodiment of a method of manufacturing the window for a display device, a pigment particulate and a color ink are separated into distinct layers, when a color layer is introduced on a window mother substrate. Accordingly, a visual appearance of agglomeration of the pigment particulate is reduced, as compared to when the pigment particulate is combined with a color ink (e.g., in a same layer). Accordingly, the reduced agglomeration of the pigment particulate may not only reduce or effectively prevent a stain in a window for a display device but may also impart a unique beauty thereto.

One or more exemplary embodiment of the above-described window for a display device may be applied to various display devices. The display device to which an exemplary embodiment of a window according to the invention may be applied includes a liquid crystal display ("LCD"), an organic light emitting diode ("OLED") display, a plasma display, an electric field effect display device, an electrophoresis display device, and the like, but is not limited thereto.

One or more exemplary embodiment of the window for a display device may be disposed on a display module. The display module to which an exemplary embodiment of a window according to the invention may be applied includes a liquid crystal display module, an organic light emitting display module, a plasma display module, an electric field effect display module, an electrophoresis display module, and the like, but is not limited thereto.

Hereinafter, exemplary embodiments of a window for a display device according to the invention are illustrated in more detail with reference to Examples. However, these Examples are exemplary, and the invention is not limited thereto.

Example 1

A combination of a transparent ink and a metal flake was firstly printed on a 300 μm-thick glass.

Subsequently, a solid color ink was secondly printed, and then, a black color ink was thirdly printed, thereby manufacturing a window for a display device.

The first, second and third printings were respectively performed using a pad printing method, and the printing layers according to the first, second and third printings respectively had a cross-sectional thickness of 7 μm, 5 μm and 5 μm.

Comparative Example 1

A window for a display device was manufactured according to the same method as Example 1, except for applying a combination of a color ink and metal flake for the first printing.

Evaluation

Appearance of the windows for a display device according to Example 1 and Comparative Example 1 was evaluated without visual enhancement or aids, that is, with a naked eye.

As a result, a stain was found on the surface of the window for a display device according to Comparative Example 1, unlike the window for a display device according to Example 1.

In addition, while the window for a display device according to Comparative Example 1 showed about 20% of a production yield, the window for a display device according to Example 1 showed a production yield of about 70% and thus, improved production efficiency.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A window for a display device, comprising
a display device window mother substrate; and
a color layer on the display device window mother substrate,
wherein the color layer comprises:
a transparent ink layer on the display device window mother substrate,
the transparent ink layer comprising a transparent ink in which a pigment particulate is disposed, the pigment particulate comprising a metal material,
a solid color layer on the transparent ink layer, and
a shield ink layer on the solid color layer.

2. The window for a display device of claim 1, wherein the pigment particulate comprises a metal flake, pearl, mica, silica, or a combination thereof.

3. The window for a display device of claim 1, wherein the solid color layer has a stacked structure comprising two or more layers.

4. The window for a display device of claim 1, wherein the solid color layer comprises a combination of two or more color inks.

5. The window for a display device of claim 1, wherein the display device window mother substrate comprises glass or a light-transmitting polymer resin.

6. The window for a display device of claim 5, wherein the light transmitting polymer resin comprises polyethyleneterephthalate, polycarbonate, polymethylmethacrylate, a polycarbonate/polymethylmethacrylate copolymer, or a combination thereof.

7. The window for a display device of claim 1, wherein the pigment particulate is included in the transparent ink layer at about 1 wt % to about 50 wt % based on a total weight of the transparent ink layer.

8. The window for a display device of claim 1, wherein the display device window mother substrate has a cross-sectional thickness of about 300 micrometers to about 1000 micrometers.

9. The window for a display device of claim 1, wherein the transparent ink layer has a cross-sectional thickness of about 4 micrometers to about 10 micrometers.

10. The window for a display device of claim 1, wherein the solid color layer has a cross-sectional thickness of about 4 micrometers to about 10 micrometers.

11. The window for a display device of claim 1, wherein the shield ink layer has a cross-sectional thickness of about 4 micrometers to about 10 micrometers.

12. The window for a display device of claim 1, wherein an overall thickness of the window for the display device has a cross-sectional thickness of less than or equal to about 1 millimeter.

13. A method of manufacturing a window for a display device, comprising
preparing a display device window mother substrate, and
forming a color layer on the display device window mother substrate,
wherein the forming the color layer on the display device window mother substrate comprises:
disposing a pigment particulate in a transparent ink to form a transparent ink layer, the pigment particulate comprising a metal material,
forming a solid color layer on the transparent ink layer including the metal material pigment particulate in the transparent ink, and
forming a shield ink layer on the solid color layer.

14. The method of claim 13, wherein the color layer is formed on the display device window mother substrate by a solution coating method or a film attachment method.

15. The method of claim 14, wherein the solution coating method comprises spin coating, screen printing, pad printing, inkjet, printing one drop filling, or a combination thereof.

16. The method of claim 13, wherein the pigment particulate comprises a metal flake, pearl, mica, silica, or a combination thereof.

17. The method of claim 13, wherein the pigment particulate is included in the transparent ink layer at about 1 wt % to about 50 wt % based on a total weight of the transparent ink layer.

18. A display device comprising:
a window on a display module,
wherein the window comprises:
a display device window mother substrate; and
a color layer on the display device window mother substrate,
wherein the color layer comprises:
a transparent ink layer on the display device window mother substrate,
the transparent ink layer comprising a transparent ink in which a pigment particulate is disposed, the pigment particulate comprising a metal material,
a solid color layer on the transparent ink layer, and
a shield ink layer on the solid color layer.

* * * * *